Figure 1:
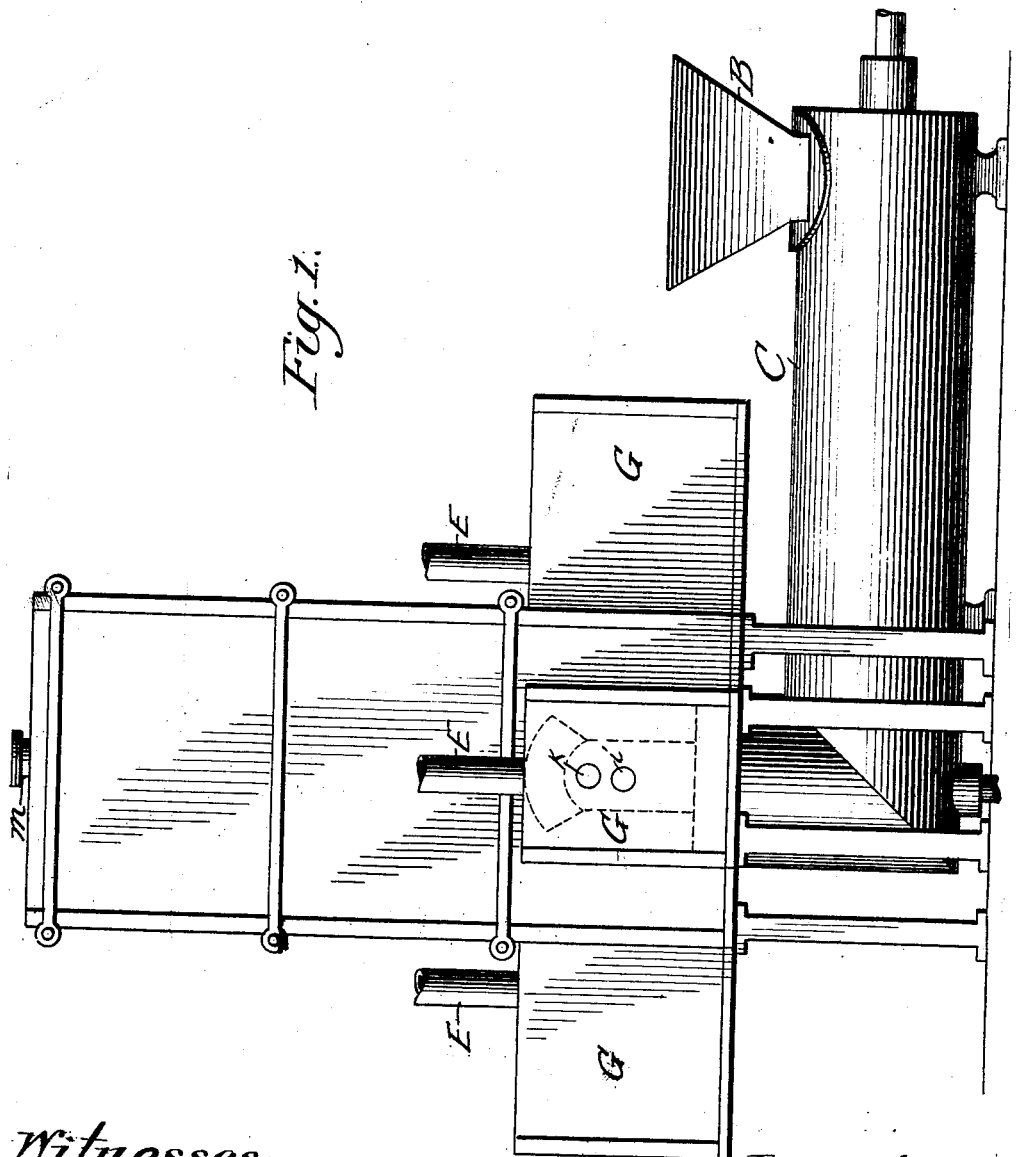

No. 879,483. PATENTED FEB. 18, 1908.
F. MEYER.
METALLURGICAL FURNACE.
APPLICATION FILED JAN. 13, 1906. RENEWED JAN. 11, 1908.

6 SHEETS—SHEET 1.

No. 879,483.

PATENTED FEB. 18, 1908.

F. MEYER.
METALLURGICAL FURNACE.
APPLICATION FILED JAN. 13, 1906. RENEWED JAN. 11, 1908.

6 SHEETS—SHEET 4.

Witnesses:

Inventor:
Franz Meyer,
by Pennie & Goldsborough,
Attorneys.

No. 879,483. PATENTED FEB. 18, 1908.
F. MEYER.
METALLURGICAL FURNACE.
APPLICATION FILED JAN. 13, 1906. RENEWED JAN. 11, 1908.

6 SHEETS—SHEET 5.

Witnesses:

Inventor:
Franz Meyer,

No. 879,483.
F. MEYER.
METALLURGICAL FURNACE.
APPLICATION FILED JAN. 13, 1906. RENEWED JAN. 11, 1908.
PATENTED FEB. 18, 1908.
6 SHEETS—SHEET 6.
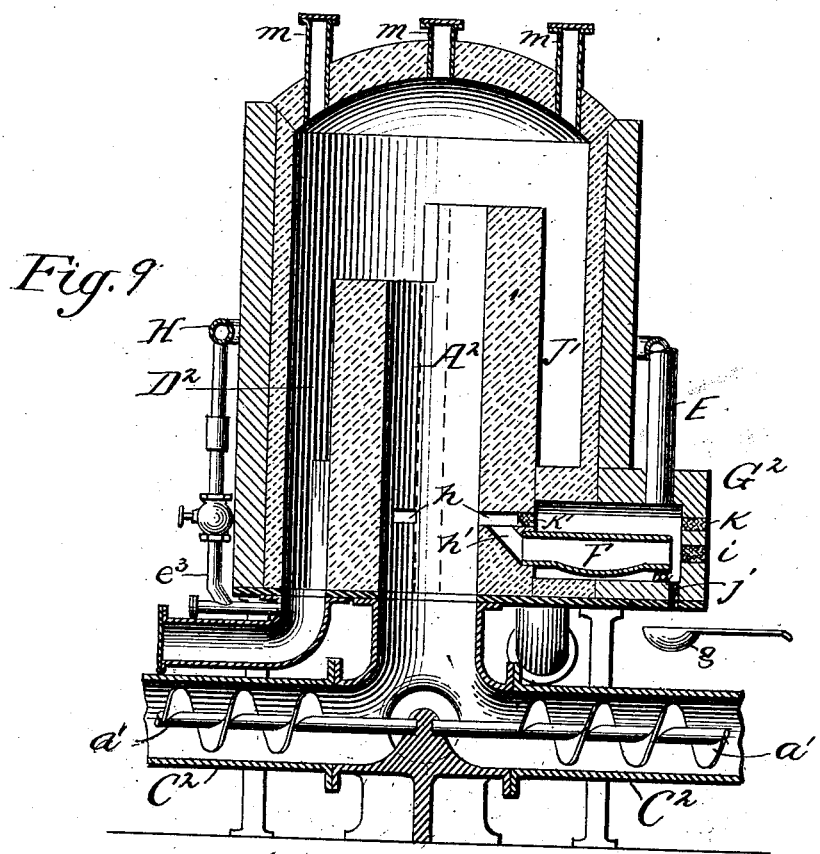
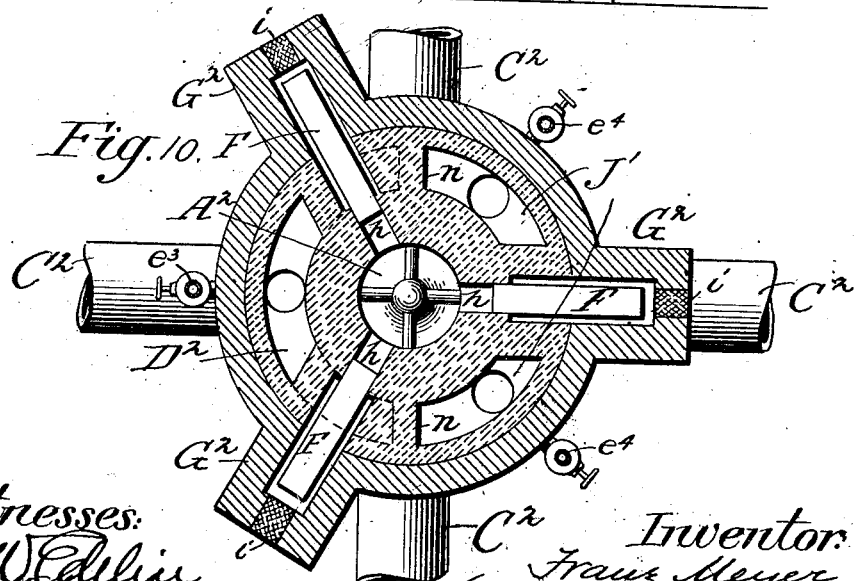
Witnesses:
Inventor.
Franz Meyer,
by Pennie & Goldsborough
Attorneys.

UNITED STATES PATENT OFFICE.

FRANZ MEYER, OF ENGLEWOOD, NEW JERSEY, ASSIGNOR TO METALLURGICAL COMPANY OF AMERICA, OF NEW YORK, N. Y., A CORPORATION OF NEW JERSEY.

METALLURGICAL FURNACE.

No. 879,483.

Specification of Letters Patent.

Patented Feb. 18, 1908.

Application filed January 13, 1906. Serial No. 295,929. Renewed January 11, 1908. Serial No. 410,445.

*To all whom it may concern:*

Be it known that I, FRANZ MEYER, a subject of the Emperor of Germany, residing at Englewood, county of Bergen, State of New Jersey, have invented certain new and useful Improvements in Metallurgical Furnaces; and I do hereby declare the following to be a full, clear, and exact description of the invention, such as will enable others skilled in the art to which it appertains to make and use the same.

My invention relates to certain new and useful improvements in metallurgical furnaces, and is designed to realize a construction wherein a continuous operation is feasible, in the sense that the spent ore or ash is progressively forced out at the top of the main stack containing the furnace charge by the lifting effect of new portions of the charge fed into the stack at its lower portion by screw conveyers or the like. The construction is especially adapted for the recovery of such metals as are volatile at the temperature at which they are reduced from their ores, as, for instance, zinc.

Other characteristic features of my invention consists: 1. In providing an auxiliary stack, or chamber for the reception of the ash from the main stack, and recuperating the waste heat of said ash, by passing up through it the air intended for sustaining combustion in the main stack. 2. In providing a third stack or chamber for the reception of fuel, when it is desired to add a volume of producer gas or similar gas to assist in raising the temperature of the charge in the main stack, or to render the atmosphere therein more reducing. 3. In providing admission ports at the top of the furnace, for the admission of fuel generally, or of fluxing material, or other re-agents if it is required to control or vary the conditions prevailing in the furnace, these ports also serving for the insertion of stoking tools or the like. 4. In providing a condenser or condensers, located at the lower part of the furnace, into which the volatile products of combustion and reaction pass, these condensers being preferably contained in chambers or compartments in which the products of combustion circulate after leaving the condensers and before passing on to the chimney stack or stacks, filters or bag rooms. The condensed metal is thus maintained in a liquid condition, appropriate to its ready collection and periodic removal.

Other minor features of advantage and novelty will also be hereinafter described.

Figure 2:
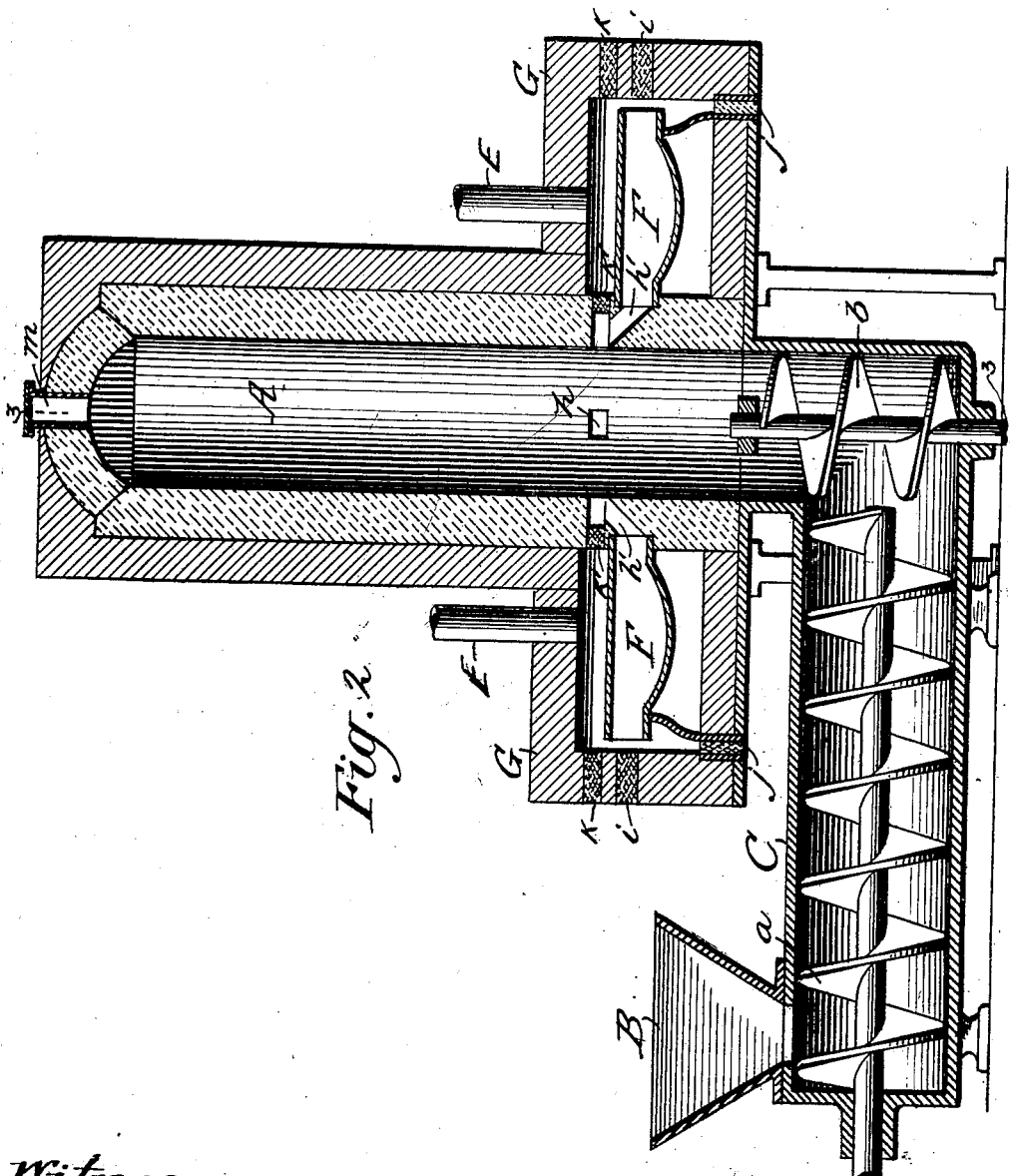
Figure 3:
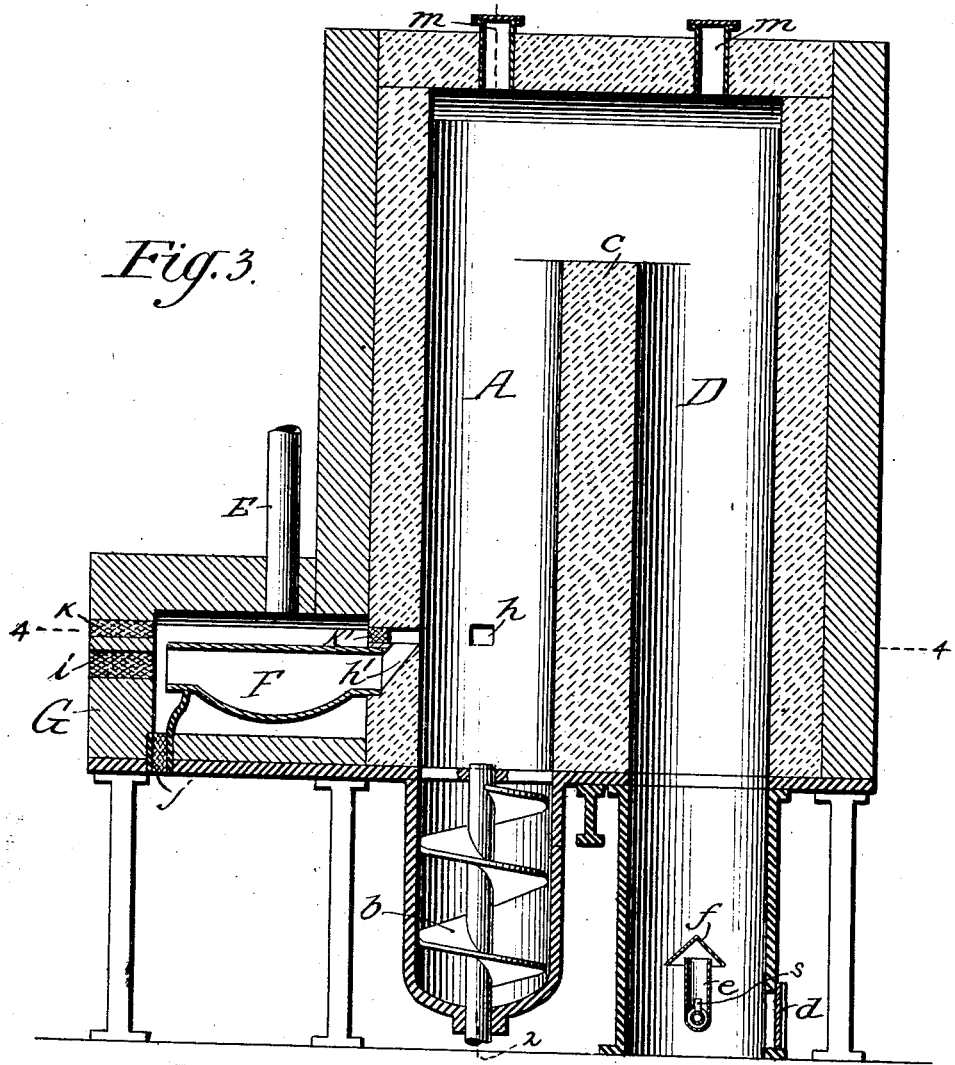
Figure 4:
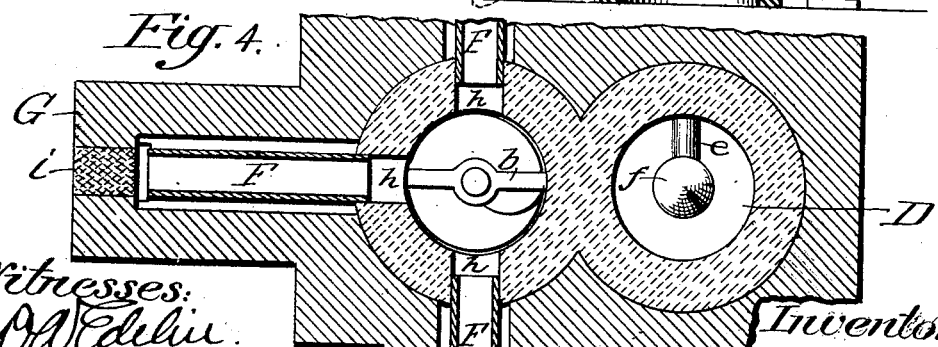
Figure 5:
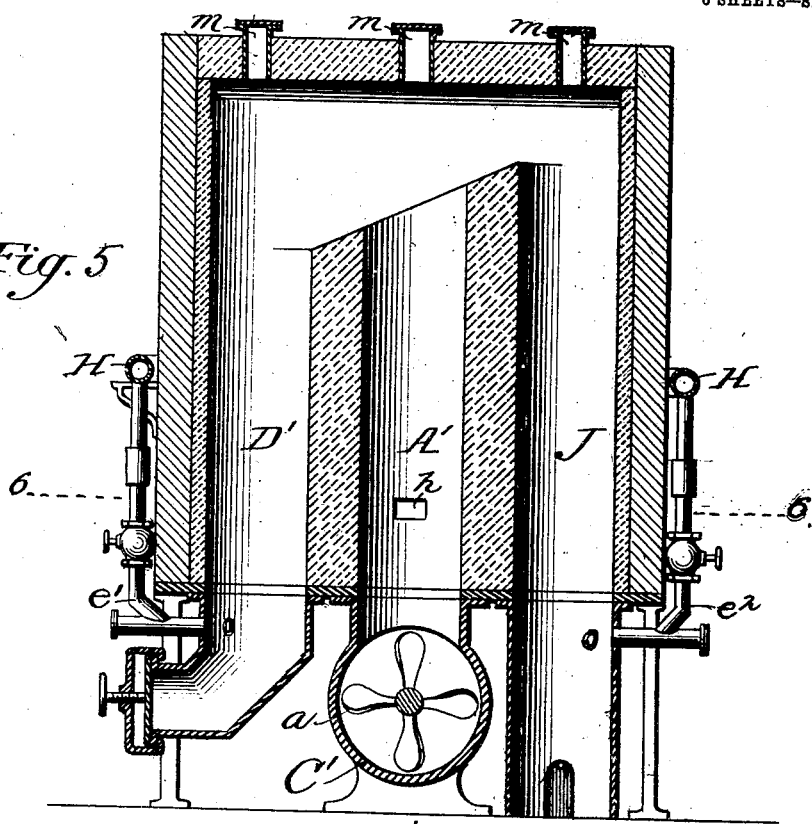
Figure 6:
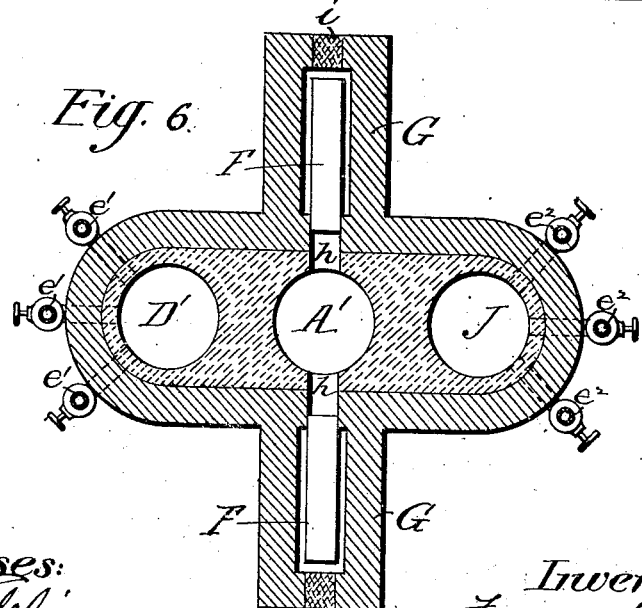
Figure 7:
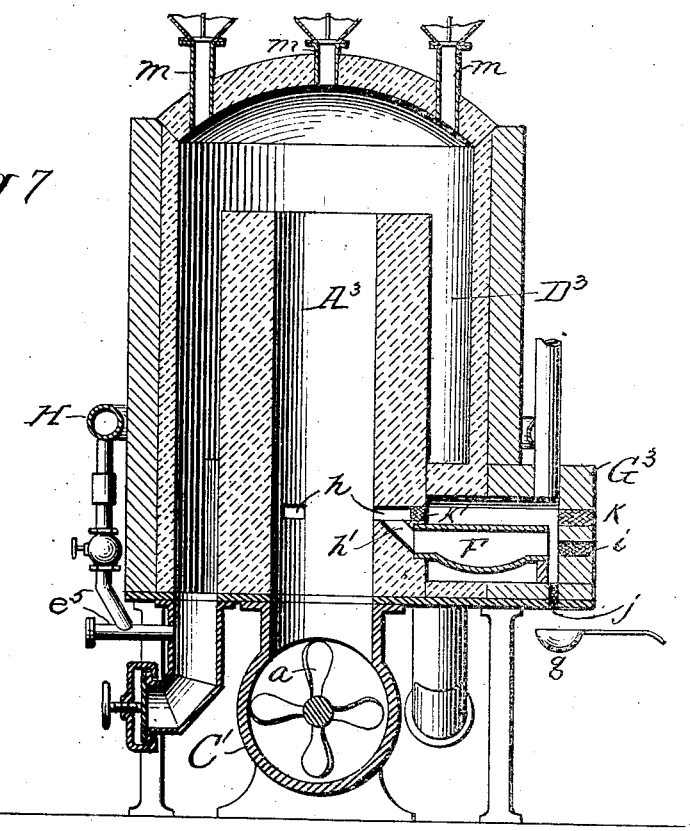
Figure 8:
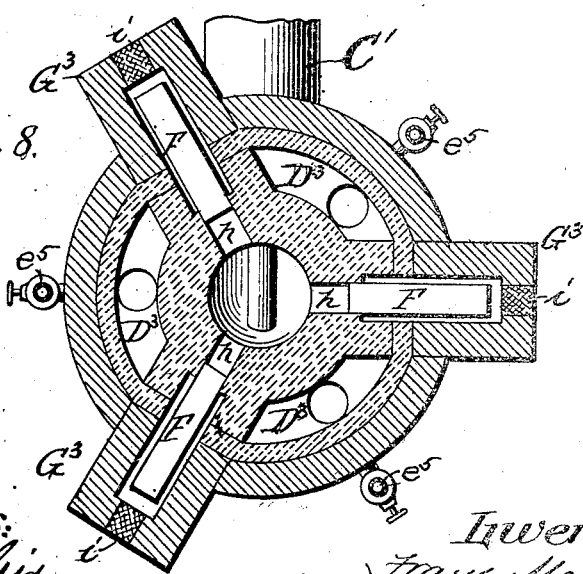

In the accompanying drawings. Figure 1 represents an elevation of a metallurgical furnace embodying one form or modification of my invention. Fig. 2 represents a vertical sectional view thereof, on the line 2—2 of Fig. 3. Fig. 3 represents a vertical sectional view, on the line 3—3 of Fig. 2. Fig. 4 represents a horizontal sectional view, on the line 4—4 of Fig. 3. Fig. 5 represents a vertical sectional view of another form or modification of my invention: and Fig. 6 represents a horizontal sectional view thereof on the line 6—6 of Fig. 5. Figs. 7 & 8 represent like views of another modification. Figs. 9 & 10 represent like views of a still further modification.

Similar letters of reference indicate similar parts throughout the several views.

Referring first to the construction shown in Figs. 1 to 4 inclusive, A indicates the main stack for the reception of the mixture of ore or like metal-bearing material containing the metal to be reduced or volatilized in the furnace, together with the fuel, fluxes or similar ingredients desirable for the particular metallurgical operation at hand. This mixture is supplied by the hopper B to a horizontal conveyer, which may conveniently consist of a feed screw $a$, operating in the conduit C, which latter communicates with the lower portion of the stack. In many cases, also, it will be desirable to supplement the horizontally acting screw $a$, with a vertically acting screw $b$, as shown, in order to diminish any tendency to clogging.

The main stack A is separated by a partition wall $c$ from an auxiliary stack or compartment D, which receive the spent ore or ash from the main stack, and a door $d$ serves as a convenient means for removing the ash or a portion thereof, from time to time. At the base of the ash stack is located the air-admission pipe $e$, having the protecting cap $f$, and which may also contain a pipe $s$, for the admission of gas, if desired, for changing the character or intensity of the reactions going on in the main stack. So, also, inlet ports $m$, permit the addition of fuel (solid liquid or gaseous), fluxing material, or any other re-agent appropriate to the treatment of the furnace charge. These ports $m$ may also serve for the insertion of suitable stoking tools for working or stirring the charge in the main stack or the cinders in the ash stack, to prevent or break up any crusts that may form or tend to form therein.

The volatile products of combustion pass downwardly through the main stack and take their exit through a series of lateral apertures $h$ therein, this down-draft being induced by the chimney stacks or exhaust pipes E, or by forcing air or gas through the admission pipes $e$ and $s$, or by both of said expedients. From the apertures $h$, they enter the condensers F, through the inclined passage ways $h'$, and the condensible metal present (as, for instance, zinc) will collect in the condensers, which I have here shown of the familiar type used in the metallurgy of zinc. In order that the condensed metal may remain in a liquid or molten state in the condensers, so that it may be readily drawn out, at intervals, as it collects, I locate the condensers in surrounding chambers G. The volatile products of combustion including all the non-condensed products of reaction issuing from the open ends of the condensers, on their way to the chimneys or exhaust pipes E, will occupy these chambers G, thereby maintaining the requisite temperature therein, which will be above the melting point of the condensed zinc or other like metal. To withdraw the metal from the condensers, the fire-clay plugs $i$, $j$, are temporarily removed, the usual hoe-like scraper is inserted into the condenser and the metal is drawn out through the open mouth of the condenser and is caught in a hand ladle, or the like, as it falls through the aperture from which the plug $j$ has been removed. One of these hand ladles or collectors is shown at $g$ in Fig. 7. Fire-clay plugs $k$, $k'$, are likewise provided, so that, when temporarily removed, a suitable bar or tool may be inserted to keep the aperture $h$ open beyond the plug $k'$. It will, of course, be understood that, after the temporary removal of these several plugs, they are replaced by new plugs, likewise of fire-clay.

In the form or modification of the furnace shown in Figs. 5 and 6, A', indicates the main stack, D' the ash stack, and C'', the supply conduit for the ore charge, in which conduit I have indicated, as an inferior substitute for a conveyer screw, the familiar forwardly-feeding stirrer $a'$ employed in pug mills. The ash stack D' is provided with the air-admission pipes $e'$, supplied from the bustle-pipe H, and additional branches $e^2$, supply the stack J, as shown. The stack J is adapted to receive a supply of solid fuel, through one of the charging inlets $m$, and is intended for use as a gas producer, its gaseous products meeting the pre-heated air which ascends through the ash stack D' and passing downwardly with said air into the main stack. The gas generated in the producer will ordinarily consist of the usual Siemns or producer gas, but may, in some instances, contain a quantity of water gas which may be generated by admitting a suitable amount of steam into the heated fuel. The upper portion of the main stack is inclined, as shown, so that as the spent charge or ash rises, it will be discharged over into the ash shaft, instead of into the shaft J. Suitable provision is made at the base of the shafts D' and J, for the removal of ash, and it will, of course, be understood that the structural and functional relation of the apertures $h$, to the condensers F, and their containing chambers G is the same as in the form of furnaces shown in Figs. 1 to 4.

The form or modification shown in Figs. 7 and 8, is of general circular contour, the main stack $A^3$ rising centrally within a surrounding annular ash stack $D^3$, so that as the ashes or cinders issue from the top of the main stack, they are equally distributed in the ash stack. The annular ash stack has a series of air admission pipes $e^5$, supplied from the bustle pipe H, and the projecting chambers $G^3$ contain the condensers F, having the chimneys or exhaust pipes E, as in the modifications before described.

In Figs. 9 and 10, I have illustrated the feature (applicable as well to the other modifications of my furnace) of providing more than one supply conduit $C^2$ for the main stack $A^2$, thereby proportionately increasing the rate of supply, and, especially, dividing up the power required for effecting the feed among the several conveyers $a'$ contained in said conduits. The feed may be further assisted, if desired, by arranging in the lower part of the main stack, a vertical conveyer (one or several) as before. I prefer this arrangement for feeding a shaft of large diameter.

The general form of the furnace illustrated in Figs. 9 and 10 is likewise circular, with the projecting chambers $G^2$, containing the condensers F and having the chimneys or exhaust pipes E. Here, also, the main shaft $A^2$ rises centrally within the outer annular walls of the furnace but a dividing wall $n$ (shown in dotted lines Fig. 7) separates the intervening space into an ash stack or chamber $D^2$, and a gas producer stack or chamber J', supplied respectively with air from the bustle pipe H, and valved branches $e^3$, $e^4$. On the side adjacent to the ash shaft or chamber $D^2$, the upper portion of the wall of the main stack $A^2$ is stepped (or inclined, if preferred) so as to direct the ash into $D^2$ instead of into J'.

Having thus described my invention, what I claim is:

1. A metallurgical furnace, having a stack for the reception of the furnace charge, means for effecting internal combustion within said charge and means for feeding the furnace charge, containing the ore or like material to be treated, progressively upward through said stack; substantially as described.

2. A metallurgical furnace, having a stack for the reception of the furnace charge, means for effecting internal combustion within said charge, a furnace charge supply conduit communicating with the base of the stack, and a conveyer for feeding the charge progressively forward in the supply conduit and upwardly through the stack; substantially as described.

3. A metallurgical furnace, having a stack for the reception of the furnace charge, means for effecting internal combustion within said charge, a furnace-charge supply conduit communicating with the base of the stack, and a conveyer for feeding the charge progressively forward in the supply conduit and upwardly through the stack, said conveyer consisting of a feed screw located at the lower part of the stack; substantially as described.

4. A metallurgical furnace, having a stack for the reception of the furnace charge, means for effecting internal combustion within said charge, means for feeding the furnace charge, containing the ore or like material to be treated, progressively upward through said stack, and an ash stack into which the spent charge is discharged; substantially as described.

5. A metallurgical furnace, having an internally heated main stack, means for feeding the furnace charge, containing the ore or like material to be treated, progressively upward through said stack, and an ash stack into which the spent charge is discharged, said ash stack being provided with an air-inlet at its lower portion, so that the air will be pre-heated as it rises through the ash stack prior to its entry into the main stack; substantially as described.

6. A metallurgical furnace, having an internally heated main stack, means for feeding the furnace charge, containing the ore or like material to be treated, progressively upward through said stack, and an ash stack into which the spent charge is discharged, said ash stack being provided with a gas-inlet at its lower portion; substantially as described.

7. A metallurgical furnace, having an internally heated main stack, means for feeding the furnace charge, containing the ore or like material to be treated, progressively upward through said stack, an ash stack into which the main stack discharges at the upper part of the furnace, and supply ports also located at the upper part of the furnace for the admission, if desired, of reducing material or the like, to vary or regulate the conditions prevailing in the furnace; substantially as described.

8. A metallurgical furnace having an internally heated main stack, means for feeding the furnace charge, containing the ore or like material to be treated, progressively upward through said stack, an ash stack into which the spent charge is discharged, and an auxiliary fuel-receiving combustion stack or chamber communicating with the upper portion of the main stack; substantially as described.

9. A metallurgical furnace, having an internally heated chamber, means for feeding the furnace charge, containing the ore or like material to be treated, progressively upward through the stack, and means for inducing a down-draft through said stack; substantially as described.

10. A metallurgical furnace, having an internally heated stack, means for feeding the furnace charge, containing the ore or like material to be treated, progressively upward through the stack, means for inducing a down-draft through said stack, and a condenser connected with the stack at its lower portion, and into which the volatile products of combustion and reaction pass as they issue from the stack; substantially as described.

11. A metallurgical furnace, having an internally heated stack, means for feeding the furnace-charge, containing the ore or like material to be treated, progressively upward through the stack, means for inducing a down draft through the stack, a condenser connected with the stack at its lower portion into which the volatile products of combustion and reaction pass as they issue from the stack, and a heating chamber surrounding the condenser to maintain the condensed metal in a liquid condition; substantially as described.

12. A metallurgical furnace, having an internally heated main stack, means for feeding the furnace charge, containing the ore or like material to be treated, progressively upward through said stack, and an ash stack into which the spent charge is discharged; said ash stack being separated from the main shaft by an annular wall; substantially as described.

13. A metallurgical furnace, having an internally heated main stack, means for feeding the furnace charge, containing the ore or like material to be treated, progressively upward through the stack, and an ash stack into which the main stack discharges, the main stack being so shaped at its upper end as to direct the spent charge into the ash shaft; substantially as described.

14. A metallurgical furnace, having an internally heated main stack, means for feeding the furnace charge, containing the ore or like material to be treated, progressively upward through said stack, an ash stack into which the spent charge is discharged, and an auxiliary fuel-receiving combustion stack, said ash stack and fuel-receiving combustion stack being separated from the main shaft by an annular wall; substantially as described.

15. A metallurgical furnace, having an internally heated stack, and means for feeding the furnace charge, containing the ore or other material to be treated, progressively upward through the stack, said means including a plurality of lateral supply conduits, each having a conveyer and all connecting with the lower portion of the stack; substantially as described.

16. A metallurgical furnace, having an internally heated main stack, means for feeding the furnace charge, containing the ore or like material, an ash stack receiving the spent charge from the main stack, means for causing a down draft through the main stack, a plurality of outlet ports in the main stack through which the volatile products of combustion and reaction issue and a condenser connected to each of said ports; substantially as described.

In testimony whereof I affix my signature in presence of two witnesses.

FRANZ MEYER

Witnesses:
F. G. HARTMANN,
H. SCHWEINSBERG.